A. HILLMAN.
DOUGH RAISING DEVICE.
APPLICATION FILED MAY 7, 1910.
967,193.
Patented Aug. 16, 1910.
2 SHEETS—SHEET 1.
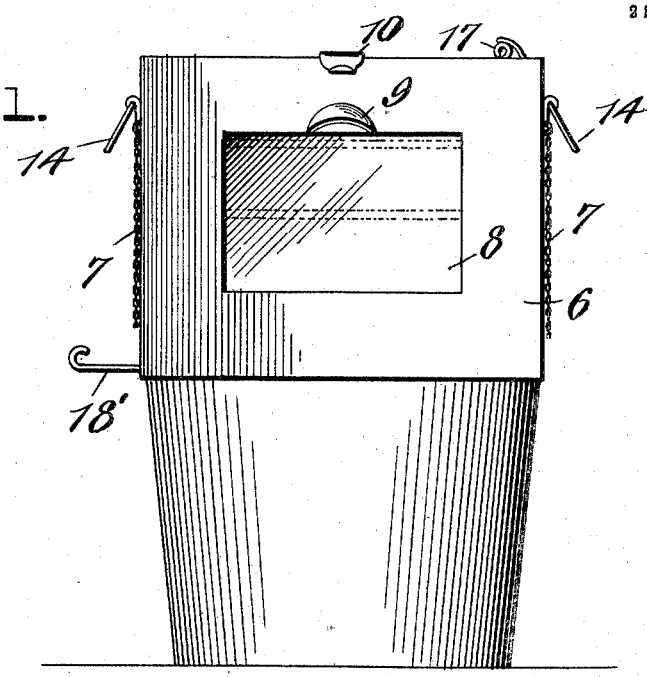
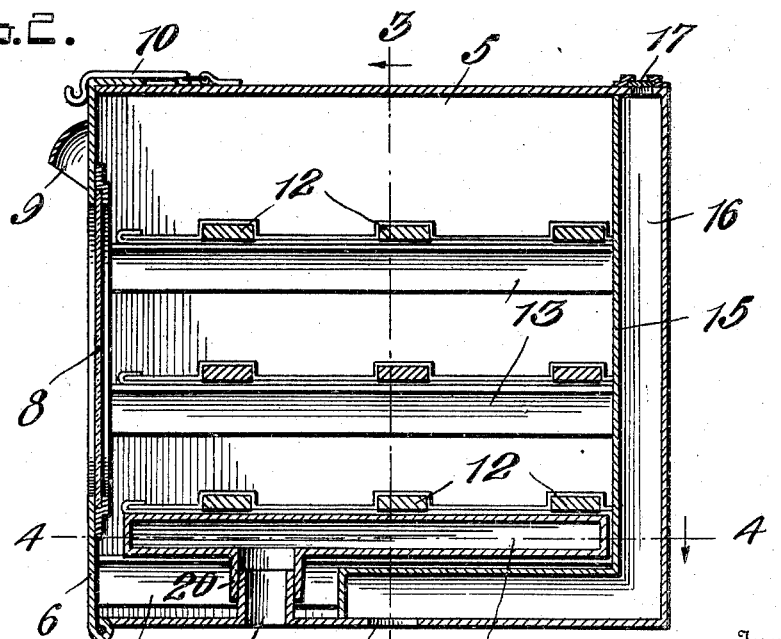
Witnesses
Chas. L. Griesbauer.
E. M. Ricketts
Inventor
A. Hillman,
By Watson E. Coleman,
Attorney

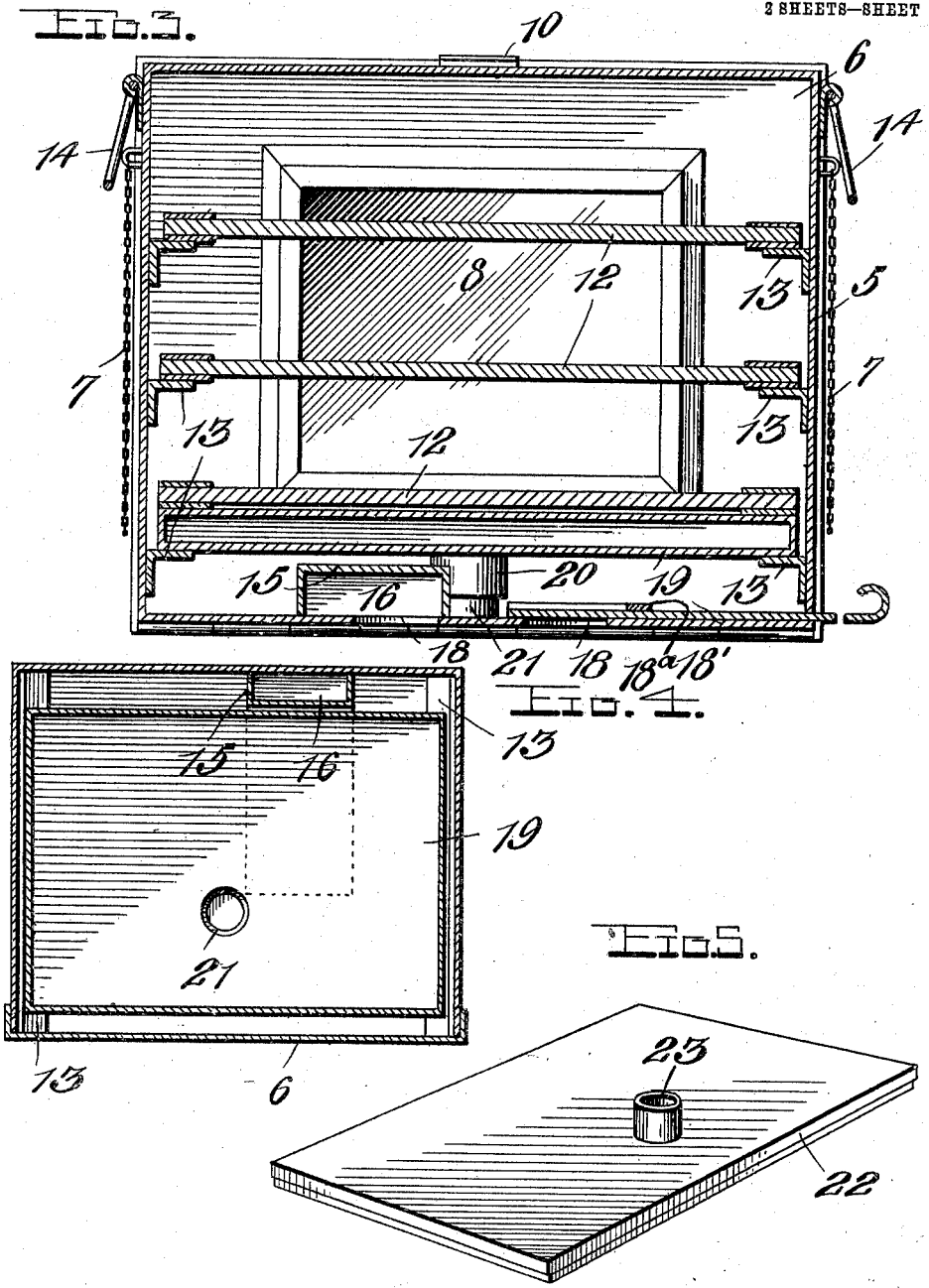

UNITED STATES PATENT OFFICE.

ANDREW HILLMAN, OF HOME VALLEY, WASHINGTON.

DOUGH-RAISING DEVICE.

967,193. Specification of Letters Patent. Patented Aug. 16, 1910.

Application filed May 7, 1910. Serial No. 559,889.

*To all whom it may concern:*

Be it known that I, ANDREW HILLMAN, a citizen of the United States, residing at Home Valley, in the county of Skamania and State of Washington, have invented certain new and useful Improvements in Dough-Raising Devices, of which the following is a specification, reference being had to the accompanying drawings.

This invention relates to improvements in kitchen articles and more particularly to a safe or cabinet adapted to receive bread or cake dough and to insure the proper raising of the dough.

The principal object of the present invention is to provide a very simple device which is adapted to be arranged over a vessel containing boiling water whereby different amounts of steam may be admitted to the interior of the safe or oven containing the bread so that the bread will raise after the dough has become dry, thus eliminating the expenditure of a large amount of fuel and time.

Another object is to provide a safe or oven having a plurality of movable shelves arranged therein, and means for increasing and decreasing the amount of steam admitted to the interior of the oven.

With these and other objects in view, the invention consists of the novel features of construction and the combination and arrangement of parts hereinafter fully described and claimed, and illustrated in the accompanying drawings, in which—

Figure 1 is a side elevation of a device embodying my invention, showing the same arranged upon a water vessel; Fig. 2 is an enlarged vertical section of the oven; Fig. 3 is a section taken on the line 3—3 of Fig. 2; Fig. 4 is a section taken on the line 4—4 of Fig. 2; and Fig. 5 is a detail perspective view of one of the removable steam regulating members.

Referring more particularly to the drawings 5 indicates a sheet metal casing which as shown is of substantially rectangular form and is provided with a hinged door 6, said door being supported from the casing by means of the chains 7. This door is also preferably provided with a glass plate 8 which may be arranged therein in any desired manner and a finger engaging projection 9 by means of which the door may be opened. This door is adapted to be held securely closed by means of the spring catch 10 pivoted at one end to the top of the casing 5.

A plurality of shelves 12 are removably supported within the casing 5 upon the angle bars 13 which are secured to the opposite sides of said casing. The opposite ends of the casing 5 are also provided with suitable handles 14 by means of which the device may be readily moved from place to place To the interior of the casing and to the back and the bottom thereof a sheet metal plate 15 is secured. This plate is bent between its longitudinal edges into substantially U-shaped form to provide a passageway 16. This channel or passageway 16 is adapted to receive the steam, which is controlled by means of a suitable sliding valve plate 17 arranged on the top of the casing 5. By adjusting this plate in its guides, the steam may be allowed to escape from the channel 16.

In the bottom of the casing spaced openings 18 are formed, one of which communicates with the forward end of the channel or passageway 16, said channel terminating short of the outer end of the casing. This opening is open at all times to admit the steam to said channel. The other opening 18 communicates directly with the interior of the casing 5 and is opened and closed by means of a sliding valve plate 18′ which is movably disposed in the guide 18$^a$ secured to the interior of the bottom of the casing said valve plate extending through one side of the casing.

In extremely cold weather when the dough becomes cold and dry, a greater amount of heat is required than in warmer weather and in order to provide means for increasing the heat and decreasing the moisture when desired, I provide the hollow rectangular member 19 which is formed upon one side with a short tubular neck 20, said neck being adapted to engage over a similar tubular neck 21 extending upwardly from the bottom of the casing 5 and through the same. When a greater amount of heat is desired, this member 19 is arranged in the casing 5 upon the lower angle bars 13, and the tubular extensions on the bottom of the casing and the member connected. Thus, it will be seen that the steam will arise through the connections and enter the hollow member 19. One of the removable shelves is placed upon this heating member and the dough in the form of a cake or loaves then arranged thereon. The valve member 17 on the top of the casing is then closed so that the channel 16 is allowed to become filled with the steam while the other valve plate 18′ is opened to admit steam to the interior of the casing. Thus the maximum heating capacity is obtained and the rising of the dough no matter how dry and cold it has become is insured.

When it is desired to reduce the heat, the member 19 is removed and the rectangular member 22 arranged in the casing in its place. This member 22 comprises a solid board covered with sheet metal, said metal sheet having a tubular extension 23 formed thereon adapted to engage over and close the steam inlet connection 21 in the bottom of the casing 5. Thus the entrance of steam at this point is entirely cut off. The sliding valve plate 18′ is now moved to close the opening 18 in the bottom of the casing and the supply at this point cut off. The valve plate 17 on the top of the casing may be adjusted to regulate the amount of steam in the channel or passage 16 so that the interior of the casing may be kept at a predetermined temperature.

In the use of my improved dough raising device, it is adapted to be arranged over an open topped vessel, said vessel being supplied with several gallons of water and placed upon the stove. The water is allowed to boil and the steam arising therefrom enters the casing in the manner set forth and provides any desired amount of moisture and heat to the interior thereof. The raising of dough in cold weather has always been extremely difficult and consumes a great quantity of fuel owing to the extreme heat which is necessary to accomplish this result. By means of my device the expenditure of fuel is reduced instead of increased and by the admission of moisture to the interior of the case, heavy cake dough that is made in a manner similar to bread dough may be raised in a very short time. The device may also be conveniently used as a cake or bread container to keep the same moist and fresh.

From the foregoing it is believed that the construction and operation of the invention will be readily understood without requiring an additional description.

The device is simple, may be constructed at a low cost and is highly durable and efficient in practical use.

While I have shown and described the preferred embodiment of the invention, it will be understood that the same is susceptible of many minor modifications without materially departing from the essential features or sacrificing any of the advantages thereof.

Having thus described the invention what is claimed is:

1. A device of the character described comprising a casing, a plurality of shelves therein, a steam receiving space arranged within said casing, means for admitting steam thereto, means for venting the steam, a removable member arranged within the casing, said member being hollow, means for admitting steam to the interior of said member, and means for admitting and controlling the admission of steam to the interior of the casing.

2. A device of the character described comprising a rectangular casing having a hinged door, a plurality of removable shelves in said casing, a substantially U-shaped plate secured to the bottom and back walls of the casing and forming a steam channel therein, one end of said channel communicating with an opening in the bottom of the casing, the other end of the channel communicating with the opening in the top of the casing, a slidable valve plate adapted to close the latter opening, a steam port in the bottom of the casing, and a hollow rectangular removable member adapted to be arranged in said casing and connected to said steam port.

3. A device of the character described comprising a rectangular casing, a hinged door adapted to close the same, a plate U-shaped in cross section secured to the bottom and back of the casing to form a steam receiving channel, said channel communicating with an opening in the bottom of the casing, means for venting the steam from said channel, an inwardly extending steam inlet port formed in the bottom of the casing, a hollow removable member arranged in said casing and connected to said port and means for admitting steam to the interior of said casing.

4. A device of the character described comprising a rectangular casing, a hinged door closing the same, a plurality of removable shelves arranged in the casing, said casing being formed with a steam passageway, means for admitting and venting steam to and from the passageway, a hollow rectangular removable member supported within the casing, means for admitting steam to said member, said casing having an opening in its bottom to admit steam to the interior thereof, and a sliding valve plate for closing said opening.

5. A device of the character described comprising a substantially rectangular casing, a hinged door closing said casing, the interior of said casing being provided with a steam passageway, means for admitting and venting steam to and from the passageway, a plurality of shelves removably arranged in the casing, a hollow rectangular member arranged in the casing below the shelves, a steam inlet port in the bottom of the casing, said member being connected therewith, and means for admitting and controlling the admission of steam to the interior of the casing.

6. A device of the character described comprising a rectangular casing having a hinged door, a plurality of shelves removably arranged in the casing, means for admitting steam to the interior of the casing, a steam inlet port arranged in the bottom of the casing, and means removably arranged in the casing connected to said port for increasing the temperature of the interior of the casing.

In testimony whereof I hereunto affix my signature in the presence of two witnesses.

ANDREW HILLMAN.

Witnesses:
W. L. RICHMOND,
H. E. SAWYER.